United States Patent
Kirisken

(10) Patent No.: US 11,153,240 B2
(45) Date of Patent: Oct. 19, 2021

(54) METHOD, SYSTEM AND COMPUTER PROGRAM PRODUCT FOR SELECTIVELY ADAPTING AND TRANSMITTING MESSAGING DATA

(71) Applicant: Vestel Elektronik Sanayi ve Ticaret A. S., Manisa (TR)

(72) Inventor: Barbaros Kirisken, Manisa (TR)

(73) Assignee: Vestel Elektronik Sanayi ve Ticaret A. S., Manisa (TR)

( * ) Notice: Subject to any disclaimer, the term of this patent is extended or adjusted under 35 U.S.C. 154(b) by 0 days.

(21) Appl. No.: 16/315,626

(22) PCT Filed: May 18, 2017

(86) PCT No.: PCT/EP2017/062018
§ 371 (c)(1),
(2) Date: Jan. 4, 2019

(87) PCT Pub. No.: WO2018/015046
PCT Pub. Date: Jan. 25, 2018

(65) Prior Publication Data
US 2019/0306095 A1    Oct. 3, 2019

(30) Foreign Application Priority Data
Jul. 18, 2016 (EP) .................................. 16180012

(51) Int. Cl.
*G06F 15/16* (2006.01)
*H04L 12/58* (2006.01)

(52) U.S. Cl.
CPC ............ *H04L 51/063* (2013.01); *H04L 51/04* (2013.01); *H04L 51/06* (2013.01); *H04L 51/10* (2013.01);
(Continued)

(58) Field of Classification Search
CPC ....... H04L 51/063; H04L 51/06; H04L 51/04; H04L 51/10; H04L 51/14; H04L 51/18; H04L 51/38
See application file for complete search history.

(56) References Cited

U.S. PATENT DOCUMENTS 5,928,325 A * 7/1999 Shaughnessy ....... G06Q 10/107
                                                        709/206
9,237,428 B2 * 1/2016 Underwood ............ H04W 4/14
(Continued)

FOREIGN PATENT DOCUMENTS

CN    101730022 A    6/2010
CN    101917676 A    12/2010
(Continued)

OTHER PUBLICATIONS

The International Search Report (ISR) for PCT/EP2017/062018 dated Jul. 31, 2017, pp. 1-4.
(Continued)

*Primary Examiner* — John B Walsh
(74) *Attorney, Agent, or Firm* — McDonnell Boehnen Hulbert & Berghoff LLP

(57) ABSTRACT

The present invention refers to a System for transmitting of messaging data representing information defined by end users and sent from a first end user device (1) to a further end user device (2). The system according to the invention at least comprises: the first end user device (1) and one further end user device (2), wherein the end user devices (1), (2) are having internet and GSM/CDMA-based connectivity capabilities, wherein at least the first end-user device (1) is equipped with an application providing a user-interface (14) for enabling a user to define the information represented by the messaging data, wherein the application reads out connectivity properties of the first end user device (1) from a control means or communication means of the first end user (Continued)

device (1), wherein message data is directed in dependency of the read out data via an internet connection path or via a GSM/CDMA-based connection path, wherein the messaging data is automatically modified in a predefined manner in case the GSM/CDMA-based connection path is selected and in case the messaging data fulfills a predefined criterion.

6 Claims, 3 Drawing Sheets

(52) U.S. Cl.
CPC ............... *H04L 51/14* (2013.01); *H04L 51/18* (2013.01); *H04L 51/38* (2013.01)

(56) References Cited

U.S. PATENT DOCUMENTS

| | | | | |
|---|---|---|---|---|
| 2006/0282536 | A1* | 12/2006 | Popkin | G06Q 10/107 |
| | | | | 709/226 |
| 2007/0283039 | A1 | 12/2007 | Kim | |
| 2009/0088188 | A1* | 4/2009 | Wormald | H04W 4/18 |
| | | | | 455/466 |
| 2012/0166567 | A1* | 6/2012 | Halahmi | H04L 51/08 |
| | | | | 709/206 |
| 2014/0258559 | A1* | 9/2014 | Vendrow | H04L 67/306 |
| | | | | 709/246 |
| 2015/0089000 | A1 | 3/2015 | Ding et al. | |
| 2015/0163260 | A1 | 6/2015 | Dayan et al. | |
| 2015/0244664 | A1 | 8/2015 | Kendal | |
| 2016/0112310 | A1* | 4/2016 | Forbes, Jr. | H04L 45/72 |
| | | | | 370/389 |
| 2016/0134571 | A1* | 5/2016 | Lindley | H04L 67/1095 |
| | | | | 709/206 |

FOREIGN PATENT DOCUMENTS

| | | |
|---|---|---|
| CN | 101771959 B | 7/2012 |
| CN | 101917676 B | 6/2013 |
| CN | 103874035 A | 6/2014 |
| CN | 103079175 B | 8/2019 |
| EP | 2 894 869 | 7/2015 |
| JP | 2004-528767 A | 9/2004 |
| WO | 2002/080011 A1 | 10/2002 |
| WO | 2005/099198 | 10/2005 |
| WO | 2012024241 A2 | 2/2012 |

OTHER PUBLICATIONS

Written Opinion of the International Searching Authority for PCT/EP2017/062018 dated Jul. 31, 2017, pp. 1-6.

Liu, Examples of English Translation of Super-IN New Words in Chinese Newspapers and Periodicals (2011).

* cited by examiner

METHOD, SYSTEM AND COMPUTER PROGRAM PRODUCT FOR SELECTIVELY ADAPTING AND TRANSMITTING MESSAGING DATA

CROSS-REFERENCE TO RELATED APPLICATIONS

This application claims the benefit of the filing date of international PCT Application No. PCT/EP2017/062018, filed on May 18, 2017 that in turn claims priority to European Patent Application No. EP 16 180 012.3, filed on Jul. 18, 2016, which are hereby incorporated by reference in their entirety.

According to claim 1 the present invention refers to a method for operating a first end user device for transmitting message data from the first end user device to at least one further end user device by means of one or multiple transmission paths, according to claim 8 to a computer program product for executing the method according to the invention and according to claim 10 to a system for transmitting of messaging data representing information defined by end users and sent from a first end user device to a second end user device.

BACKGROUND OF THE INVENTION

Document U.S. Pat. No. 5,974,449A1 discloses an apparatus for storing and forwarding messages. Said apparatus comprises a first network interface for interfacing with a first network; a second network interface for interfacing with a second network; means for receiving an incoming message and delivery information from said first network interface, said incoming message having a message content format of a first type; a converter for converting said incoming message having a message content format of a first type to a message having a message content format of a second type in response to said incoming message and said delivery information, said converter using said delivery information for selecting said message content format of a second type for said message; means for presenting said message having said message content format of a second type to at least one recipient specified in said delivery information, said message content format of a second type including a format where said message is stored in a location in memory, said location in memory pointed to by location information, said means for presenting having a means for creating a web page for presenting said incoming message; and wherein said delivery information includes a destination address, said destination address sent through a DTMF generator having a telephone keypad having a button signifying a ".", symbol, an "@" symbol, and a ".com" symbol, said symbols having a defined position on said button.

Document US2013157627A1 discloses a method that includes accessing a communication sent from a first user to one or more second users; searching multiple communication threads for a specific thread associated with both the first and second users; and if the specific communication thread is located, then adding the communication to the thread; and for each second user, sending the communication to the second user using a communication protocol selected determined to be appropriate.

Document WO2013188078A2 discloses an embodiment that provides tools that allows a user to share content on one device with multiple other users using different devices. To facilitate the sharing operations, the content sharing tools allow the user to create a shared stream that represents a set of shared content and invite one or more recipients to subscribe to the shared stream. When a recipient subscribes to the shared stream, the set of content is streamed across one or more of his or her devices. The content sharing tools of some embodiments can be used to exchange comments regarding the stream's content.

Document US2014221027A1 discloses a method for transmitting multimedia messages of a multimedia message service using short messages of a short message service in a telecommunications network, the method comprising: embedding a multimedia message within a data portion of a short message, the data portion following a header portion of the short message; including in said short message a first identifier indicating that said multimedia message is present in said data portion; including in the data portion of the short message a second identifier indicating a type of said multimedia message; and transmitting the short message to a receiver.

Document US2007276587A1 discloses an internet connected service, said service comprising: means for a plurality of content configuring users to configure, over an internet connection to said service, content for presentation to a mobile data processing system of a mobile user wherein said content is associated to at least one configured situational location; means for determining a mobile situational location of said mobile user; means for automatically finding said content by comparing said mobile situational location with said configured situational location; and means for sending said content to said mobile data processing system.

None of prior art documents discloses a method that efficiently transfers message data with both multimedia and text data while either receiver or transmitter has no internet connection.

OBJECT OF THE INVENTION

Thus, it is an object of the present invention to provide a method, a computer program product and a system that enables an improved transfer of message data.

DESCRIPTION OF THE INVENTION

The before mentioned object is solved by a method according to claim 1 for operating a first end user device for transmitting message data from the first end user device to at least one further end user device by means of one or multiple transmission paths. The inventive method preferably at least comprises the steps: Displaying a user interface by means of a display unit of the first end user device, wherein the user interface comprises a section for defining information by the user which has to be sent as message data, wherein the message data comprises at least some data different from data representing text information, in particular data representing picture information or sound information; Detecting which one of the multiple transmission paths is available, wherein a main transmission path is selected in case it is available or in case a data transmission speed is higher than a predefined threshold, wherein an auxiliary transmission path is selected in case the main transmission path is not available or in case a data transmission speed is lower than a predefined threshold; Sending the message data in response to a detection of a user command via the selected transmission path, wherein the message data is modified prior to sending in case the auxiliary transmission path is selected. The modification of the message data is preferably carried out by an application that runs on the first end user device. The application preferably checks connectivity features of the first end user device and highly preferable also of one or more further end user devices, in particular which is or which are selected as recipients of the message data.

This solution is beneficial since the user of the first end user device and preferably also the user of the further end user device/s does not have to select a specific transmission path or does not have to adapt the message data to fit to the selected transmission path. The modified message data can preferably be understood as hybrid message data, that preferably comprises data representing text and further data related to the further content, in particular the picture and/or sound information of the original message data. The message data (of the original message) preferably represents text information and at least any of the group at least comprising of video information or picture information or sound information.

Further preferred embodiments of the method according to the present invention are mentioned, explained and/or described in the following specification parts and are subject matter of the dependent claims.

According to a preferred embodiment of the present invention message data is modified in such a manner to include predefined link message data representing information differing from the determined information of the message data which is transmitted via the auxiliary transmission path. Thus, the link message data preferably comprises a link or routing data for requesting data transmission of the remaining message data or of the complete message data to the further device. The remaining message data or the complete message data preferably can be transmitted via the main transmitting path after a later detection of an available main transmission path. Such a transmission is preferably automatically triggered, in particular by the before mentioned application, in case a main transmission path is set up respectively detected or in case the data transmission speed of a main transmission path is above a predefined threshold. Such a threshold can be e.g. 1 KB or 10 KB or 100 KB or 200 KB or 500 KB or 100 KB per second. It is additionally or alternatively possible that the remaining message data or the complete message is stored on one or multiple storage means, in particular a server device or a cloud server device. A data transfer from such a storage means to the further end user device can be triggered automatically by an application running on the further end user device or due to a user command of the user of the further end user device. E.g. such a user command can be touching, clicking or pressing of specific button or area/s of the end user device. It is also conceivable that such a command can be inputted by voice or a specific movement of the end user device or any further specific, in particular predefined, sensor biasing. This embodiment is beneficial since message data not being able to transmit over the auxiliary transmission path is replaced by data enabling an, in particular automated, procurement of that data at a later time and over the main transmission path.

Preferably only data below a predefined threshold, in particular below 500 KB or below 25 KB or below 100 KB or below 10 KB or below 5 KB or below 2 KB or with respectively representing a specific format, in particular a text format, is transmitted via the auxiliary transmission path, wherein the modified message data is preferably adapted in such a manner that e.g. a link or routing data is referenced by data representing such a text format. Alternatively or additionally it is also possible that further link or routing data is transmitted besides data representing text information, wherein the further link or routing data does not consist of data representing text only. Preferably, the modified message data comprises text data representing information for indicating that the received message lacks information compared with the original message.

The main transmission path is preferably set up by an internet connection, in particular an instant messenger means, and the auxiliary transmission path is preferably set up by a GSM network connection, in particular SMS or MMS or JOYN.

The before mentioned object is further solved by a computer program product for executing a method according to a herein mentioned method. The inventive computer program product or application is preferably part of a Jabber (XMPP) like system, where all communication passes through server/s. Additionally or alternatively it is also possible that the inventive computer program product represents an application that is part of a system based on P2P IM messaging or P2P messaging with server handshake. End-to-end or any additional or alternative encryption is also possible, which includes end-to-end, server side or any other kind of encryption.

Additionally, the before mentioned object is also solved by a system for transmitting of messaging data representing information defined by end users and sent from a first end user device to a second respectively further end user device and vice versa. The inventive system preferably at least comprises the first end user device and one second end user device, wherein the end user devices are having Internet, in particular WLAN, UMTS or LTE capabilities, and GSM/CDMA-based connectivity capabilities, wherein at least the first end-user device is equipped with an application providing a user-interface for enabling an user to define the information represented by the messaging data, wherein the application reads out connectivity properties of the end user device from a control means or communication means of the first end user device, wherein message data is directed in dependency of the read out data via an internet connection path, in particular Wi-Fi, 3G, 4G, 5G, etc., or via a GSM/CDMA-based connection path, wherein the messaging data is automatically modified in a predefined manner in case the GSM/CDMA-based connection path is selected and in case the messaging data fulfills a predefined criterion.

The modification of message data causes according to a further preferred embodiment of the present invention a reduction of message data, wherein the reduction causes a limitation of message data to a predefined amount. Additionally or alternatively causes the modification of message data a replacement of message data, wherein a replacement of message data causes a limitation of message data to a predefined amount and the addition of routing data for requesting a download of the remaining message data or of the complete message via the internet connection at a later time. This solution is beneficial, since the remaining or complete message data can be pushed to the further end user device or pulled (downloaded) by the further end user device.

All end user devices are preferably equipped with the same application. End user devices are preferably mobile devices, in particular tablet PCs, smart watches and/or mobile phones respectively smart phones or satellite phones. Additionally or alternatively it is conceivable that laptops or other digital devices, in particular desktop computers or vehicle communication systems, can be considered as end user device in the sense of the present invention.

According to a further preferred embodiment of the present invention the application operated on the first end user device checks the internet connection of the first end user device and the internet connection of the second end user device. The auxiliary transmission path is preferably only selected in case the main transmission path has a poor connectivity, in particular low data transmission speed, or no connectivity.

Further benefits, goals and features of the present invention will be described by the following specification of the attached figures, in which exemplarily components of the invention are illustrated. Components of the systems and methods according to the inventions, which match at least essentially with respect to their function can be marked with the same reference sign, wherein such components do not have to be marked or described in all figures.

In the following the invention is just exemplarily described with respect to the attached figures.

BRIEF DESCRIPTION OF THE DRAWINGS

FIG. 1 shows an example for a system according to the present invention. Reference number 1 indicates a first end user device, which is able to send data via a main transmission path, in particular an internet connection, and via an auxiliary transmission path, in particularly a GSM/CDMA-based connection. The status 6 of the main transmission path and the status 8 of the auxiliary transmission path are indicating that a communication via each path is possible in that situation (T=0). In case the user U1 wants to transfer a text message to a further user U2 having also an end user device 2 the user U1 only needs to type in the desired word and after a sending command the message is directed to the further end user device 2. Since text messages are easily transferable by means of an instant messenger or e.g. SMS the routing of this message can be carried out easily. The further end user device 2 has in the situation T=0 no internet connection but GSM/CDMA connection. Since an application running on the first end user device 1 checks if the further end user device 2 is actually connected to the internet it recognizes that the further end user device 2 is actually not connected to the internet. Thus, the message data representing the text message is routed via the auxiliary transmission path, in this case SMS 102.

Figure 1:
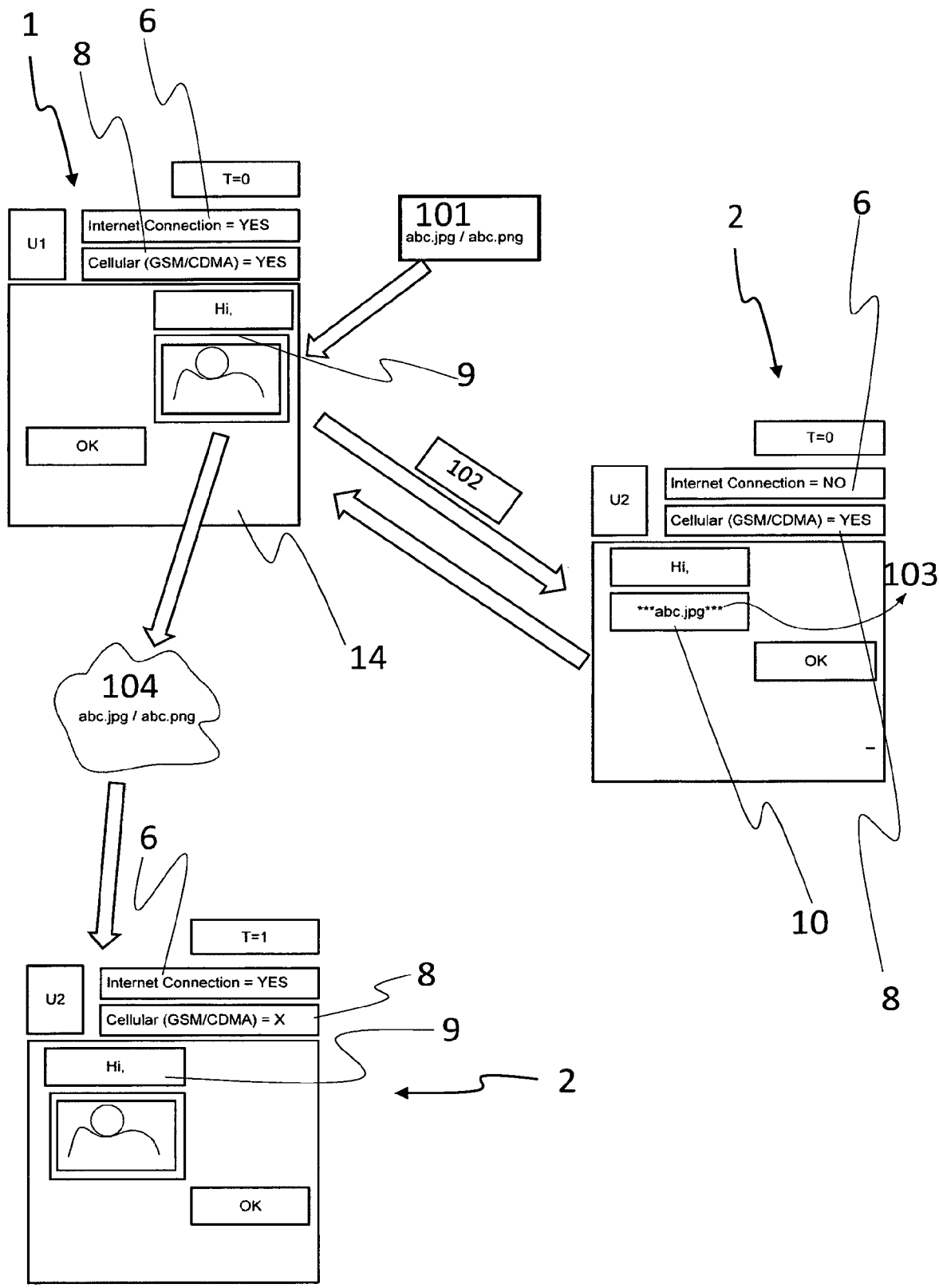
FIG. 1 shows an example for a general concept of the present method and system.

If the original message 9 comprises instead of text data only also further data, like picture data or sound data, the original message 9 is modified, in particular link or download or routing data is provided, wherein the modified message 10 respectively the modified message data, in particular without the data representing the picture information, is sent via the auxiliary transmission path to the further end user device 2. The modified message 10 preferably comprises a denote/replacement marking, which can be outputted, in particular visualized respectively displayed, to the further user U2. In case the further end user device 2 has internet access again at a later time T=1 the referenced message data are preferably automatically downloaded by the further end user device 2 via the main transmission path. Photograph or image data 101 or alternative data can be received from any source (camera, memory etc.).

In case the first end user device 1 and the further end user device 2 are connected via the main transmission path all data is preferably sent via this transmission path.

Thus, in case the first end user device 1 has access to the main transmission path and to the auxiliary transmission path and the further end user device 2 only has access to the main transmission path, than all data will preferably be transmitted via the main transmission path. The routing of the message data is preferably performed by an application which has access to the data transfer means of the end user device and which has access respectively provides the user interface 14.

Reference number 104 indicates an example for the main transmission path, in particular a server or cloud (e.g. a Jabber like IM).

The inventive messaging method respectively the inventive messaging system can be understood as unified messaging system and is preferably working on one and the same interface for all messaging activities. As shown in FIG. 1, during texting the system preferably continuously checks an internet connection availability of both sender and receiver. Thus, the messaging system described herein, preferably always, tries to send as many information as possible with resources available.

If a hybrid message, comprising e.g. data representing text information and data representing picture and/or sound information and/or link or routing or download information, is send if any of the communicating parties are not available on internet then the system modifies the message data respectively converts the multimedia content to a text denote/marking and replaces this denote/marking in case internet is again available.

Figure 2:
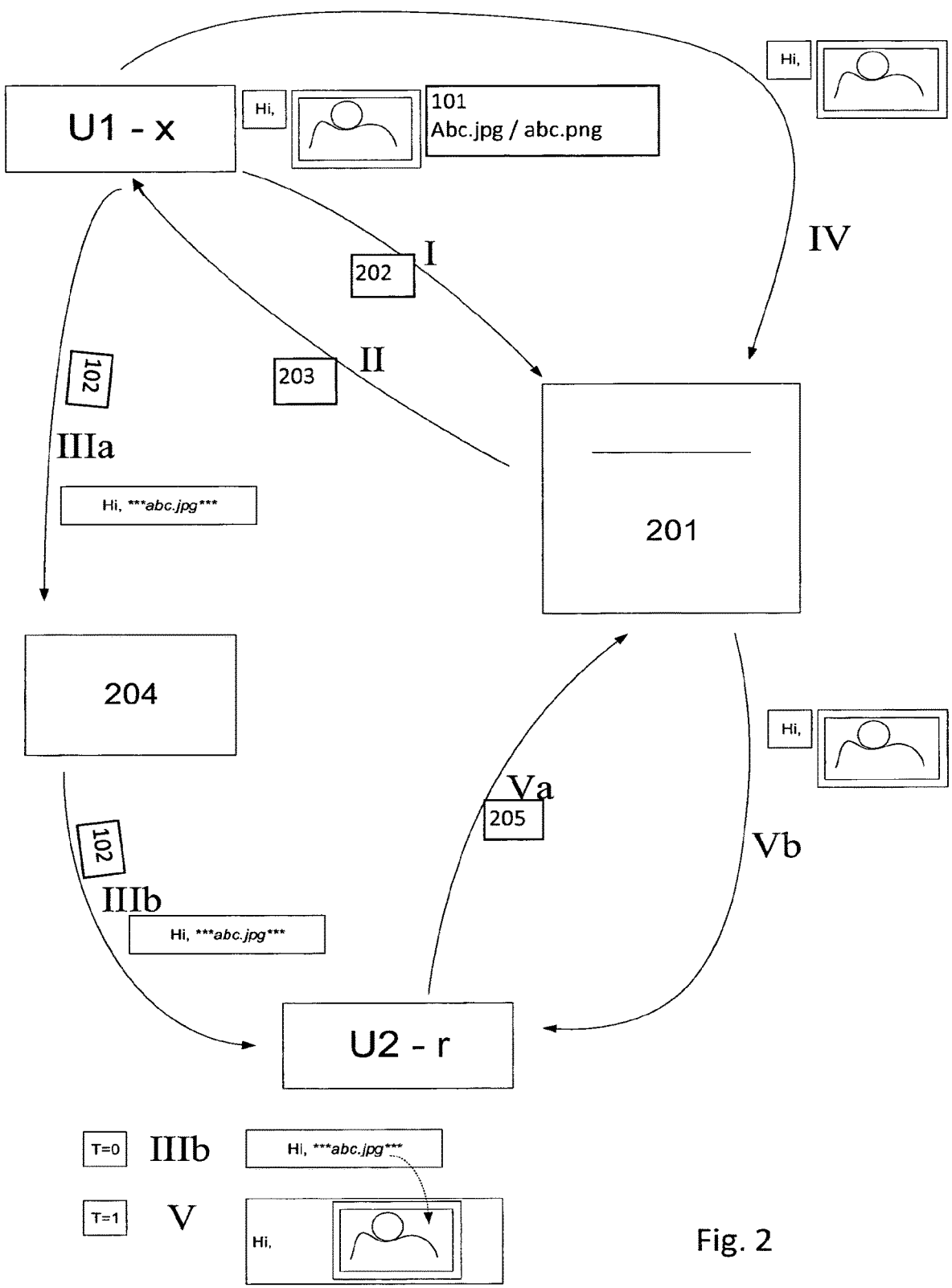
FIG. 2 shows a further example of the present method and system more detailed.

FIG. 2 shows a more detailed message transfer scheme. According to this scheme in a first step I it is checked 202 if a transmission via the main transmission path is possible respectively if an internet connection is available on the receiver U2-*r* site. In case the main transmission path is not available respectively in case no internet is available preferably a signal 203 is directed back to the first end user device 1 indicating that no valid internet connection is available.

Step III is divided into step IIIa and IIIb, wherein in step IIIa modified message data is transferred via the auxiliary transmission path to a GSM/CDMA cellular provider and in step IIIb from the GSM/CDMA cellular provider to the further end user device 2. The modified message 10 is outputted to user U2-*r* and after the first end user device 1 receives the information that the further end user device has access to the main transmission path the first end user device transmits the missing message data or the complete message data via the main transmission path in step IV. The missing message data or the complete message data is thereby preferably transmitted to a server or cloud means 201 that transmits the data according to step Vb to the further end user device 2 after in step Va the main transmission path is detected respectively after the internet connection is available.

It is alternatively or additionally conceivable that the further end user device 2 first checks if internet is available (step Va) and then requests the first end user device 1 to send the missing message data or the complete message data via the main transmission path.

It is alternatively or additionally also conceivable that the first end user device 2 sends the missing message data or the complete message data directly (T=0) to the server respectively cloud means 201 and in case the further end user device does not have access to the main transmission path the missing message data or the complete message data is store on the server or cloud means, in particular until the data is requested or until a predefined duration is over.

As an further alternative situation with respect to FIG. 1 or FIG. 2, it is also possible in case U1-*x* has no internet connection and tries to send combined data with both text and multimedia information, again a modified message, in particular with denote/replacement marking, is sent but multimedia content respectively information such as picture information or sound information is kept in internal memory of the first end user device respectively in U1-*x* until an internet connection is available for U1-*x*.

Figure 3:
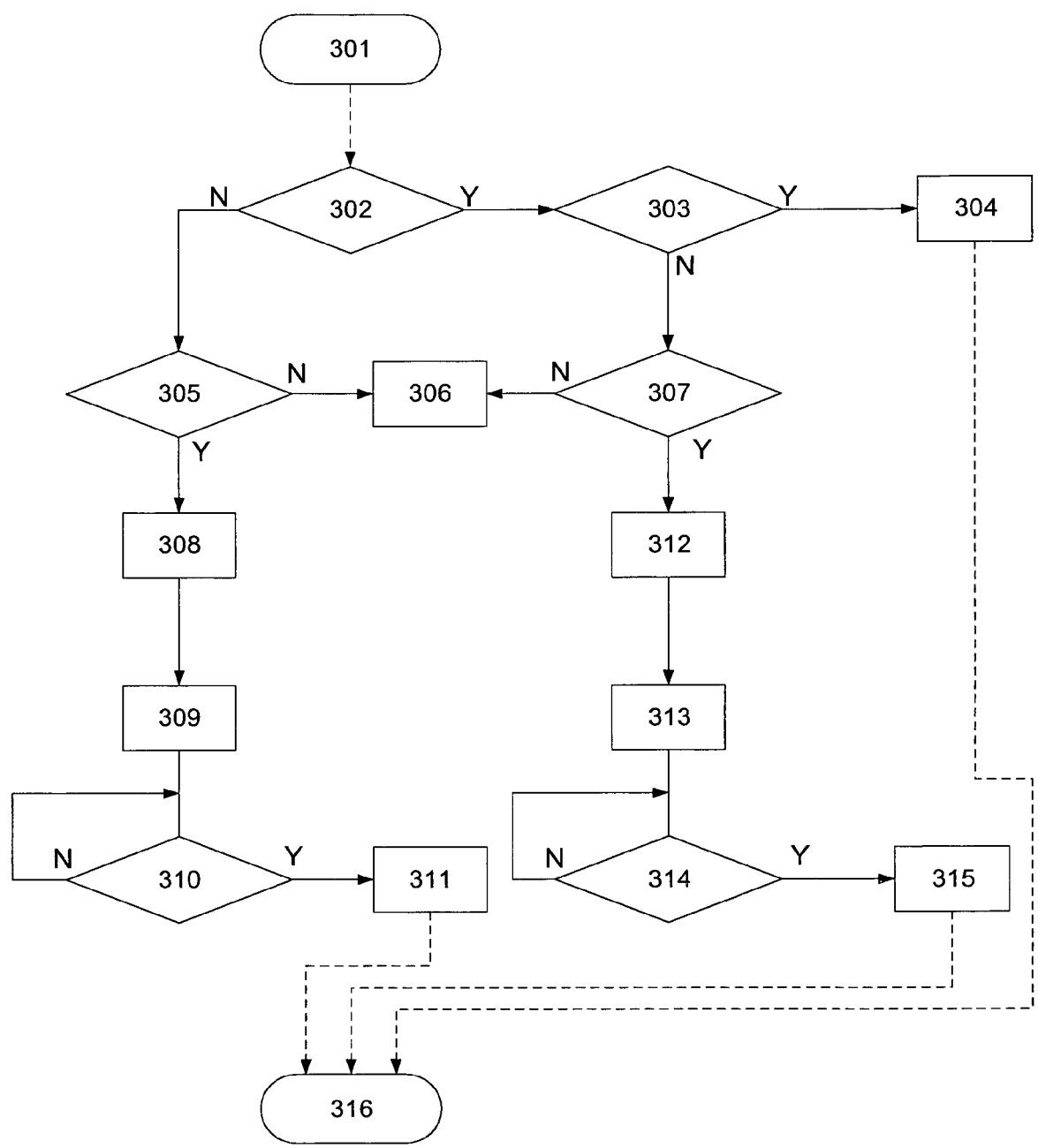
FIG. 3 shows a flow chart representing a preferred sequence in the present method and system.

FIG. 3 shows a flow chart. According to the flow chart reference number 301 represent the start of texting. It is checked at 302 if an internet connection is available for the sender (Y: Yes/N: No). It is further checked in 303 if an internet connection available for the receiver. If the internet connection is available for the receiver reverence number 304 indicates a use of an IM (instant messenger) over the main transmission path, in particular internet and the texting ends.

In 305 is checked, if the message includes hybrid content such as text and picture. If the check result in 305 is no, then a SMS is send in step 306 and the texting ends.

In 307 is checked if the message includes hybrid content such as text and picture or sound. In case the result is no, then a SMS is send in step 306 and the texting ends.

In case the check result is yes, then the whole message is send to server or cloud means 201. Then, modified message data is sent, in particular text only message with denote/replacement marking text, to receiver via SMS in step 313. It is checked in step 314 if internet connection is available for the sender. If the check is negative than the check is repeated. In case the check is yes a pull (upload) of the multimedia content to receiver and replace denote/replacement marking text with multimedia content is performed and the texting ends.

If the check in 305 is yes, then the multimedia content is preferably kept in device memory and the original message data is modified, in particular a denote/replacement marking text is added, in step 308. After that in step 309 a SMS with text only is sent. In step 310 is checked if an internet connection is available for the sender. In case the result is no, the check is repeated until the result is yes or until the check is timed out. In case the check result is yes in step 311 a synchronization of the further end user device with the content stored on the server or cloud means 201 takes place.

Thus, the present invention refers to a System for transmitting of messaging data representing information defined by end users and sent from a first end user device 1 to a further end user device 2. The system according to the invention at least comprises:
the first end user device 1 and one further end user device 2, wherein the end user devices 1, 2 are having internet and GSM/CDMA-based connectivity capabilities,
wherein at least the first end-user device 1 is equipped with an application providing a user-interface 14 for enabling a user to define the information represented by the messaging data, wherein the application reads out connectivity properties of the first end user device 1 from a control means or communication means of the first end user device 1,
wherein message data is directed in dependency of the read out data via an internet connection path or via a GSM/CDMA-based connection path,
wherein the messaging data is automatically modified in a predefined manner in case the GSM/CDMA-based connection path is selected and in case the messaging data fulfills a predefined criterion.

Furthermore, the present invention is directed to a method for operating a first end user device 1 for transmitting message data from the first end user device 1 to at least one further end user device 2 by means of one or multiple transmission paths. The method preferably comprises at least the steps: Displaying a user interface 14 by means of a display unit of the first end user device 1, wherein the user interface 14 comprises a section for defining information by the user which has to be sent as message data 9, wherein the message data 9 comprises at least some data different from data representing text information, in particular data representing picture information or sound information; Detecting which one of the multiple transmission paths is available, wherein a main transmission path is selected in case it is available or in case a data transmission speed is higher than a predefined threshold, wherein an auxiliary transmission path is selected in case the main transmission path is not available or in case a data transmission speed is lower than a predefined threshold, Sending the message data 9 in response to a detection of a user command via the selected transmission path, wherein the message data 9 is modified prior to sending in case the auxiliary transmission path is selected.

REFERENCE NUMBERS

T=0 The first initial time where hybrid messaging started
T=1 The time later after T=0
U1 First user of texting activity
U1-*x* First user of texting activity (sender in exemplary case)
U2 Second user of texting activity
U2-*r* Second user of texting activity (receiver in exemplary case)
X Don't care
1 first end user device
2 further end user device
4 the further end user device at a different time
6 status of main transmission path
8 status of auxiliary transmission path
9 information represented by the original message data
10 information represented by the modified message data
14 user interface
101 Photograph or image can be from any source (camera, memory etc.)
102 SMS
103 Denote/replacement marking
104 Server or cloud (Jabber like IM)
201 Server or cloud
202 Is internet connection available in U2-*r*?
203 U2-*r* internet connection is not available
204 GSM/CDMA Cellular provider
205 Internet connection available for U2-*r*
301 Start texting
302 Is internet connection available for sender? (Y: Yes/N: No)
303 Is internet connection available for receiver?
304 Use IM over internet
305 Is message includes hybrid content such as text and picture?
306 Send SMS
307 Is message includes hybrid content such as text and picture?
308 Keep multimedia content in device memory and add denote/replacement marking text
309 Send SMS with text only
310 Is internet connection available for sender?
311 Synchronize stored content with server
312 Send whole message to server
313 Send text only message with denote/replacement marking text to receiver via SMS
314 Is internet connection available for sender?

315 Pull (upload) multimedia content to receiver and replace denote/replacement marking text with multimedia content
316 End texting

The invention claimed is:

1. A method for operating a first end user device for transmitting message data from the first end user device to at least one further end user device by means of one or multiple transmission paths, comprising the steps:

displaying a user interface by means of a display unit of the first end user device, wherein the user interface comprises a section for defining information by the user which has to be sent as the message data, wherein the message data represents video information and/or picture information and/or sound information;

detecting which one of the multiple transmission paths is available, wherein a main transmission path is selected in case the main transmission path is available, wherein the main transmission path is set up by an instant messenger means, wherein an auxiliary transmission path is selected in case the main transmission path is not available the auxiliary transmission path is set up by SMS or MMS; and sending the message data in response to a detection of a user command via the selected transmission path, wherein the message data is modified prior to sending in case the auxiliary transmission path is selected, wherein the message data is modified in such a manner to include predefined link message data representing information different from determined information of the message data which is transmitted via the auxiliary transmission path, wherein the predefined link message data comprises a link or routing data for requesting data transmission of remaining message data or of complete message data to the one further end user device, and wherein remaining message data or complete message data is transmitted via the main transmitting path after a later detection of an available main transmission path.

2. The method according to claim 1, wherein only data below a predefined threshold or with a specific format is transmitted via the auxiliary transmission path.

3. The method according to claim 1, wherein the message data represents text information and at least any of the group at least comprising video information or picture information or sound information.

4. A system for transmitting of messaging data representing information defined by end users and sent from a first end user device to a further end user device, comprising:

the first end user device and one further end user device, wherein the first end user device and the further end user device each have internet and GSM/CDMA-based connectivity capabilities, wherein at least the first end user device is equipped with an application providing a user-interface for enabling a user to define information represented by message data, wherein the application reads out connectivity properties of the first end user device from a sender of the first end user device, wherein the message data is directed in dependency of read out data via an instant messenger means or via a GSM/CDMA-based connection path, wherein the GSM/CDMA-based connection path is selected in case the instant messenger means is not available, wherein the message data represents video information or picture information or sound information, wherein the message data is automatically modified in a predefined manner in case the GSM/CDMA-based connection path is selected and in case the messaging data fulfills a predefined criterion, and wherein the modification of the message data causes a replacement of the message data, wherein the replacement of the message data causes a limitation of the message data to a predefined amount and an addition of routing data for requesting a download of remaining message data or of a complete message via the instant messenger means at a later time.

5. The system according to claim 4, wherein the first end user device and the further end user device are each equipped with the same application.

6. The system according to claim 4, wherein the application operated on the first end user device checks an internet connection of the first end user device and an internet connection of the further end user device.

* * * * *